Dec. 16, 1958   E. LONG ET AL   2,864,759
NUCLEAR REACTORS

Filed June 30, 1955   6 Sheets-Sheet 1

Inventor
EVERETT LONG ET AL
By Larson & Whiting
Attorney

Dec. 16, 1958     E. LONG ET AL     2,864,759
NUCLEAR REACTORS

Filed June 30, 1955     6 Sheets—Sheet 2

Inventor
EVERETT LONG ET AL
By Larson and Whiting
Attorney

Dec. 16, 1958 E. LONG ET AL 2,864,759
NUCLEAR REACTORS

Filed June 30, 1955 6 Sheets-Sheet 3

Top Block
Upper Tile
Lower Tile
Bottom Block

United States Patent Office 2,864,759
Patented Dec. 16, 1958

2,864,759

NUCLEAR REACTORS

Everett Long, Warrington, and James Wilfred Ashley, Appleton, England, assignors, by mesne assignments, to the United States of America as represented by the United States Atomic Energy Commission Application June 30, 1955, Serial No. 519,055

4 Claims. (Cl. 204—193.2)

This invention relates to nuclear reactors and it is concerned with graphite moderator structures for nuclear reactors such as, for example, Patent No. 2,708,656, issued May 17, 1955.

In the conventional graphite moderated nuclear reactor the graphite moderator structure fulfills multiple functions. In the first place it serves to moderate neutron energies down to thermal levels whereby a chain reaction can be maintained with natural or only slightly enriched uranium. In the second place it serves to locate the fissile fuel elements on a suitably spaced lattice and thirdly it serves to define channels for coolant flow over the elements. For these last two functions the moderator must be physically stable and contain a minimum of leakage paths for the coolant, such paths representing wasted pumping power and temperature dilution of a coolant gas emerging from the reactor. Another function served by the moderator is to provide channels to accommodate control rods, irradiation facilities, measuring gear etc.

It is customary that the graphite moderator structure is made from an assembly of graphite blocks and certain problems arise in such an assembly. These problems arise primarily from the necessity of maintaining physical stability in consideration of various factors. The most prominent of these factors is the phenomenum known as Wigner growth, that is a growth attributable to the effects of radiation whilst in the reactor. Other factors are those of thermal expansion and the forces (when gas cooling is used) across the graphite structure tending to displace the structure. The problem of Wigner growth in one known construction has been met by making the structure as stacks of uniform right parallelepiped blocks positioned in layers extending in the direction of the length of the blocks, the blocks having minimum Wigner growth properties in the direction of the length of the blocks, and slat-like ties disposed in slots cut in the blocks at mating faces of adjacent layers of the blocks, the slots intersecting at the longitudinal axes of the blocks and the ties having minimum Wigner growth properties along their lengths. Wigner growth, a substantially irreversible deformation, anisotropic and of uncertain character, can be allowed for by supporting the blocks making up the structure so that space all round the blocks is provided for dimensional changes. In a vertically orientated reactor, that is a reactor having vertical coolant channels, the problem is one of locating the vertical axes of the coolant channels whilst allowing adequate space around the blocks for growth. However, the existence of spaces between the graphite blocks in the moderator structure has three disadvantages: firstly, the net graphite density is reduced; secondly, paths can be set up which allow neutron streaming and thirdly there can be a leakage of coolant gas along the spaces. This third disadvantage becomes serious when the gaps between the blocks are in communication with the fuel-element coolant channels and the reactor is in use for providing heat for steam generation for electrical power.

It is an object of the present invention to provide a graphite structure for a nuclear reactor having a vertical orientation which is physically stable having regard to dimensional changes set up by the Wigner growth properties of the graphite.

It is also an object of the present invention to provide a graphite structure for a nuclear reactor arranged so that leakage of coolant gas along spaces in the structure is reduced.

The graphite structure according to the invention comprises stacks of uniform right prismatic graphite blocks positioned in layers extending in the direction of the lengths of the blocks, the blocks defining coolant channels parallel to their length and having minimum Wigner growth properties in the direction of their length, and pairs of graphite tiles separating adjacent end faces of the blocks, the tiles being arranged so that first, they form two layers between each layer of blocks with their principal faces parallel to the end faces of the blocks, second, that all the tiles in any one layer have minimum Wigner growth properties in a direction which is one co-ordinate axis normal to the longitudinal axes of the blocks and that all the tiles in the adjacent layers have minimum Wigner growth properties in a direction which is the other coordinate axis normal to the longitudinal axis, third, the principal faces of the tiles and the end faces of the blocks are provided with means defining interlocking keys and keyways parallel to both said co-ordinate axes, fourth, the side walls of said tiles which are normal to the direction of minimum Wigner growth in their respective tiles butt together and the other side walls are spaced apart, fifth, the length of the side walls of the tiles lying along the direction of minimum Wigner growth is greater than the parallel dimensions of the vertical blocks above and below and is equal to the required lattice pitch of the coolant channels, and sixth, the tiles have means defining apertures co-axial with and of similar size to said coolant channels.

A graphite structure embodying the invention is now described with reference to the accompanying drawings wherein.

Figure 1:
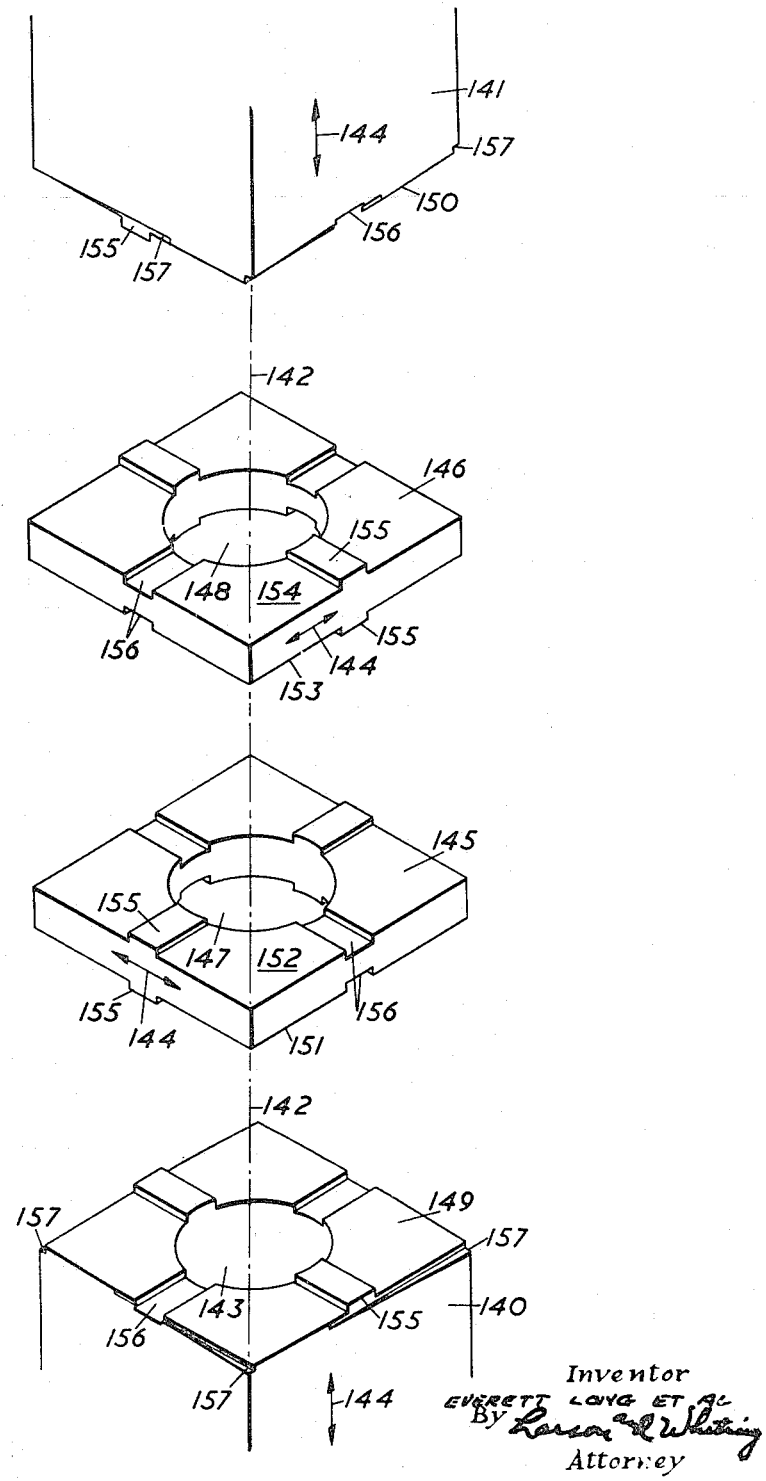
Fig. 1 is an exploded view of the ends of two graphite blocks in adjacent layers separated by two tiles.

Looking generally at Fig. 1 there is a right prismatic block 140 which is one of a lower layer of similar blocks and extending above it a right prismatic block 141, one of the next upper layer of similar blocks. The longitudinal axis of the blocks is indicated by the dotted line 142. In the complete graphite structure the axes 142 are arranged on a rectangular lattice. Vertical axial coolant channels 143 are provided. The blocks 140 and 141 have minimum Wigner growth in the direction indicated by the arrows 144 (i. e. the direction of the grain in the graphite). A pair of tiles 145, 146, having central holes 147, 148 to line up with and of slightly larger size than the coolant channels 143, separate the adjacent end faces 149 of block 140 and 150 of block 141. The direction of minimum Wigner growth in the tiles is also indicated by the arrows 144 and it is seen that all the arrows 144 lie along one or other of three co-ordinate axes. The principal faces 151, 152, 153, 154 of the tiles are parallel with the faces 149 and 150. The faces 149, 150, 151, 152, 153 and 154 are provided with inter-locking keys 155 and keyways 156 which are parallel to the complementary co-ordinate axes as represented by the arrows 144 on the tiles.

The detail of Fig. 1 is as follows: the blocks 140, 141 are square in section, having a side dimension of 7.75 inches and a length of thirty inches. The keys and keyways 155, 156 in the blocks 140, 141 are at right angles to one another but twisted through 2°±2½" relative to the sides of the blocks. Small cutaway portions 157 are provided, having an angle of 2°, on the end edges of the block. The dimension of the keys 155 on the blocks 140 and 141 are 0.994" x 0.18" and the dimension of the keyways 156 are 1.001" x 0.241" with a tolerance of .001" on all dimensions. The dimensions of the tiles 145 and 146 are 8" on the dimension of the arrows 144 and 7.75" on the other dimension thereby providing a lattice pitch for fuel elements located in the channels 143 of 8". The allowance for Wigner growth with the above dimensions is 0.25". The side dimension of the blocks 140, 141 and the dimensions of the tiles which allow for Wigner growth vary throughout the graphite structure in a manner to be described later with reference to Fig. 4.

The rule to be usefully followed in the making of the tiles is that keys are made reaching to the side face of the tile which has minimum growth and the keyways are cut to the other side faces, i. e. keys are provided parallel to the 7.75" dimension and keyways parallel to the 8" dimension. This allows the structure to be assembled with conventional tolerances between keys and keyways which will loosen and not tighten during the life of the reactor. The two tiles 145, 146 are identical but they are assembled with a 90° twist relative to one another. The blocks 140, 141 are also identical but in assembly the blocks in one layer are upside down relative to the blocks in the adjacent layer.

Figure 2:
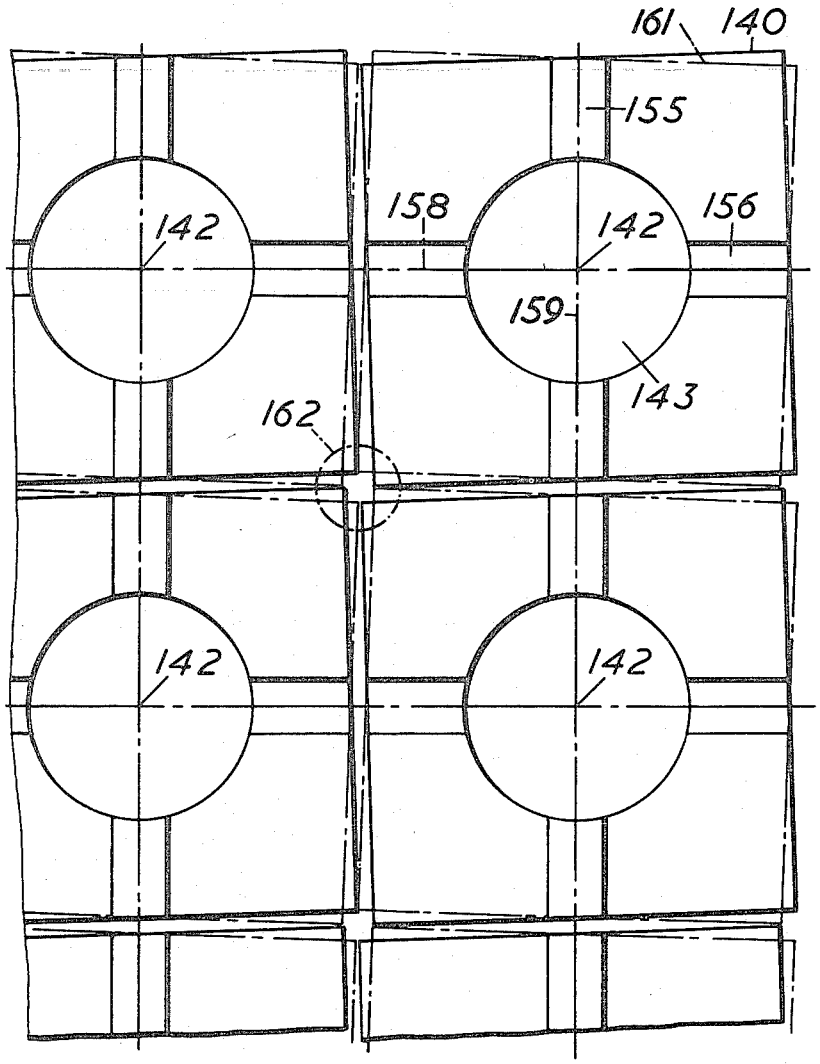
Fig. 2 is a plan view of four adjacent graphite blocks in a single layer.
Figure 2A:
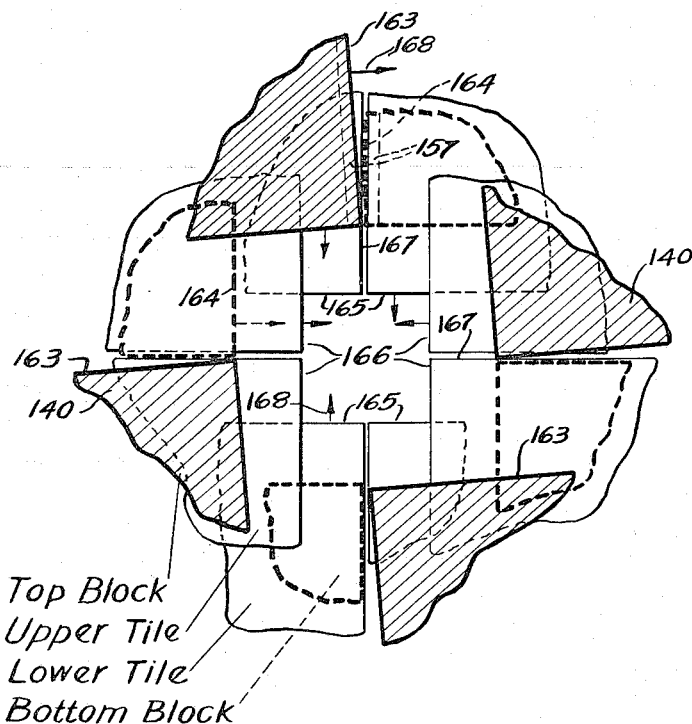
Fig. 2a is an enlarged view of a part of Fig. 2 showing the relative positions of tiles and blocks.

In Fig. 2 co-ordinate axes 158 and 159 are indicated by the chain dotted lines. The keys and keyways 155, 156 on the ends of blocks 140 are parallel to these axes but in view of the 2° twist referred to above the blocks take up a twisted position as shown. This twisted position ensures that the maximum length of direct path in the horizontal plane along which neutrons can stream before encountering graphite is 8" approximately. This feature is the subject matter of copending application Serial No. 519,056. The overlap of the tiles relative to the blocks limits the direct vertical path to about thirty inches in all except small areas at the corners of the tiles. The position of the graphite blocks in the next lower layer is indicated by line 161 which corresponds also to the position of blocks 141 in the next higher layer. The coolant channel 143 is shown. An enlarged view of the area defined by the circle 162 is shown in Fig. 2a. Corners 163 of the blocks 140 are shown as heavy lines. Corners 164 of the blocks below are shown as dotted lines. Corners 165 are those of the adjacent tiles in one layer and corners 166 are those of adjacent tiles in the adjacent layer of tiles. The faces 167 are the butting side faces of the tiles. The direction of Wigner growth is indicated by arrows 168. It is seen that as the corners 163 and 164 move under Wigner growth conditions one edge of the corners passes over the butting side faces 167 of the tiles. In order to ensure an unimpeded expansion the cutaway parts 157 are provided. This figure does not show all of the cutaway parts 157 which could be shown. See Fig. 1 for location and arrangement thereof.

Vertical control rod holes are provided as required in a position indicated by the circle 162 (Fig. 2). The corners of blocks and tiles are cut away to provide for these holes, due allowance being made for Wigner growth so that the control rods have a free passage. The voidage of the whole graphite structure is about 3%.

Figure 3:
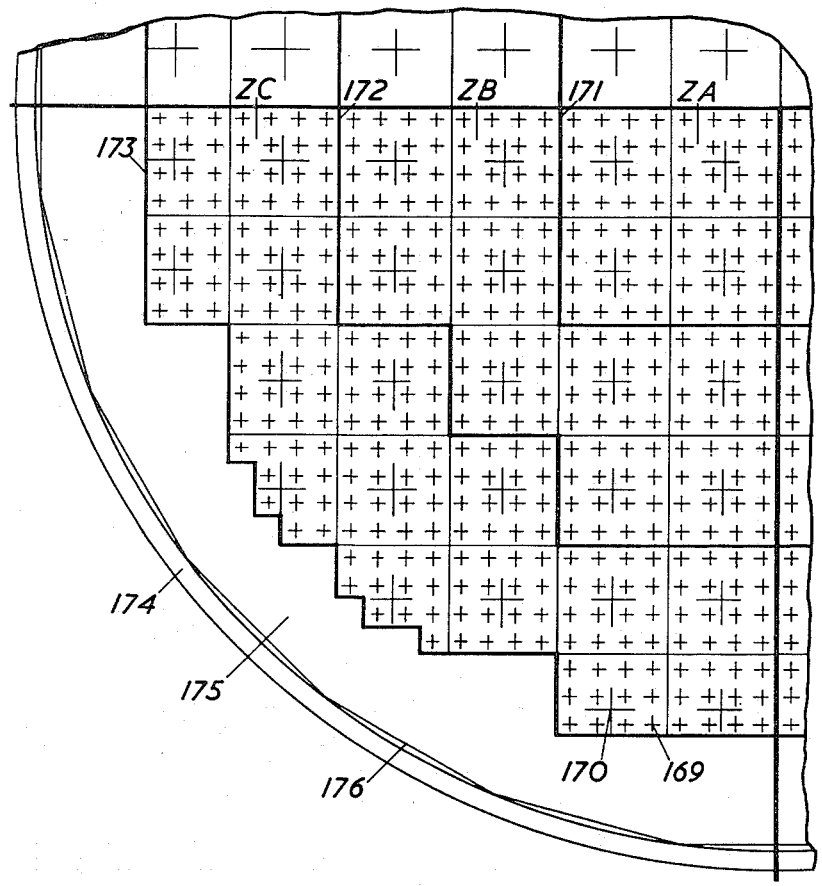
Fig. 3 is a quadrant plan view taken mid-way up the core of a vertically orientated graphite structure.

In Fig. 3 a symmetrical quadrant of a graphite structure is shown. The axes of the coolant channels are indicated by the crosses 169. The channels are grouped in sixteens (except at the periphery) and each group is provided with a control rod hole as indicated by the crosses 170. The graphite structure is divided into three transverse zones, called zones ZA, ZB and ZC the outer boundaries of which are indicated by the lines 171, 172 and 173 respectively. The quadrant ZA is shown as having sixty-four channels each of 4.16" diameter; ZB has one hundred and forty-four channels each of 3.95" diameter and ZC has two hundred and sixteen channels of 3.61" diameter. The control rod holes are 3.25" diameter. The spacing of the coolant channels is on a square lattice pitch of 8". The total number of fuel element channels in the whole structure is 1696. The change in channel diameter provides an approximate adjustment to allow for equal temperature rise of coolant passing through the channels.

The irregular outline of ZC is encased in solid graphite blocks without Wigner spacing which function as a reflector 175. The outline of the mass formed by the reflector blocks is a 24 side polygon 176 of 36'0" diameter taken across the corners. This structure is supported in a pressure vessel 174.

Figure 4:
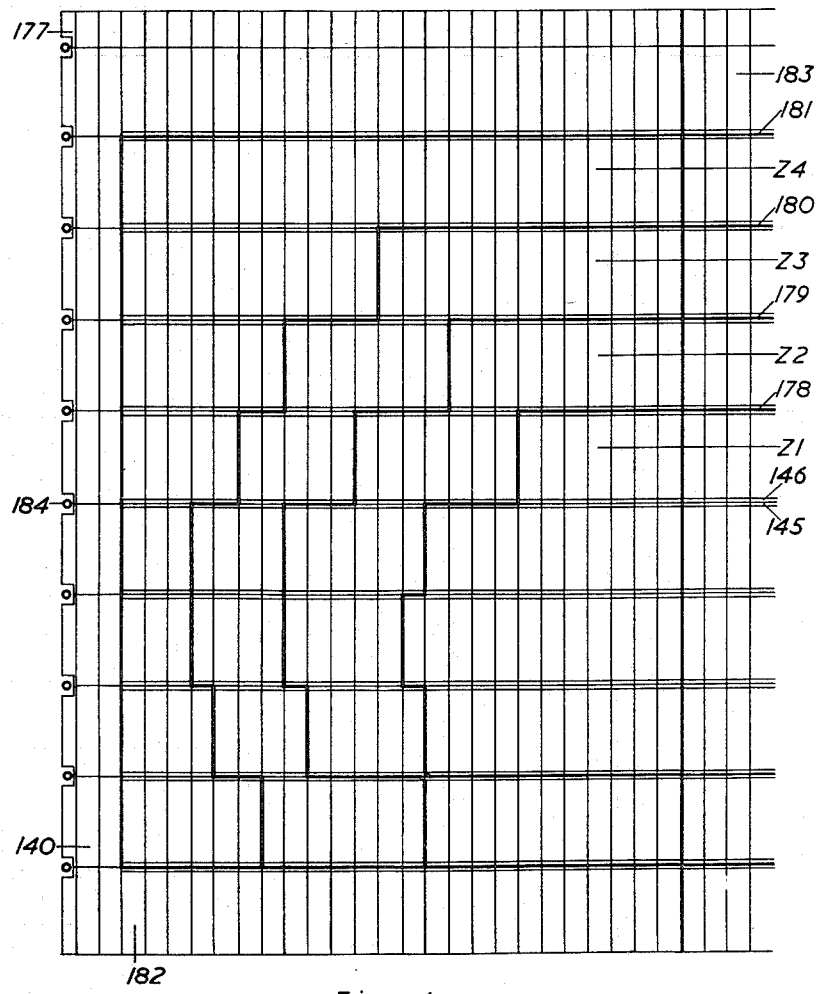
Fig. 4 is a half elevation taken along a centre line of the structure of Fig. 3.

In Fig. 4 the graphite structure is also shown consisting of ten layers of full length blocks 140 separated by two layers of tiles 145, 146 as described with reference to Figs. 1 and 2. A partial layer of blocks 177 is provided at the top. A bottom layer 182 of blocks serves as a base reflector and a top full layer 183 and the partial layer 177 serve as a top reflector. The structure is divided into zones called zones Z1, Z2, Z3, and Z4 the outer boundaries of which are indicated by the lines 178, 179, 180 and 181 respectively. These zones serve to define the Wigner tolerances on the blocks 140 and the tiles 145, 146. In Z1 the tolerance is 0.25" and in Z2 the tolerance is 0.18". Tolerances of 0.12" and 0.07" exist in Z3 and Z4 respectively. The zones represent an approximate measure of graphite growth in view of both neutron flux (Wigner growth) and temperature. The height of the graphite structure is 27 feet and it is designed for operation with inlet and outlet gas coolant temperatures of 140° C. and 350° C. respectively.

The physical stability of the graphite structure is achieved for the most part by the butting of faces of the tiles in conjunction with the cross keying provided by the keys and keyways. Tension bands 184 are provided around the 24-sided structure at each layer.

Figure 6:
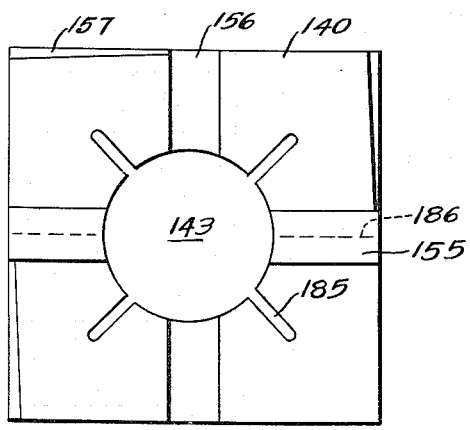
Fig. 6 is a plan view of a modified graphite block.

By having coolant channels which are bores in solid blocks leakage between channels is kept down. The close fitting end faces to the graphite blocks and tiles only allow interchannel leakage along the clearance between the keys and keyways. The graphite blocks are subjected to a greater Wigner growth on their inner dimension than on their outer dimensions as the radiation exposure is heavier on the inner surface. In one arrangement to relieve these stresses, as shown in Fig. 6, the blocks are cut lengthwise with inner radial cuts 185 which do not penetrate to the outside of the blocks. A further stress relief is obtained by cutting right through the blocks as indicated by the dotted lines 186, but this introduces inter-channel leakage and reduces the rigidity of the structure.

Figure 5:
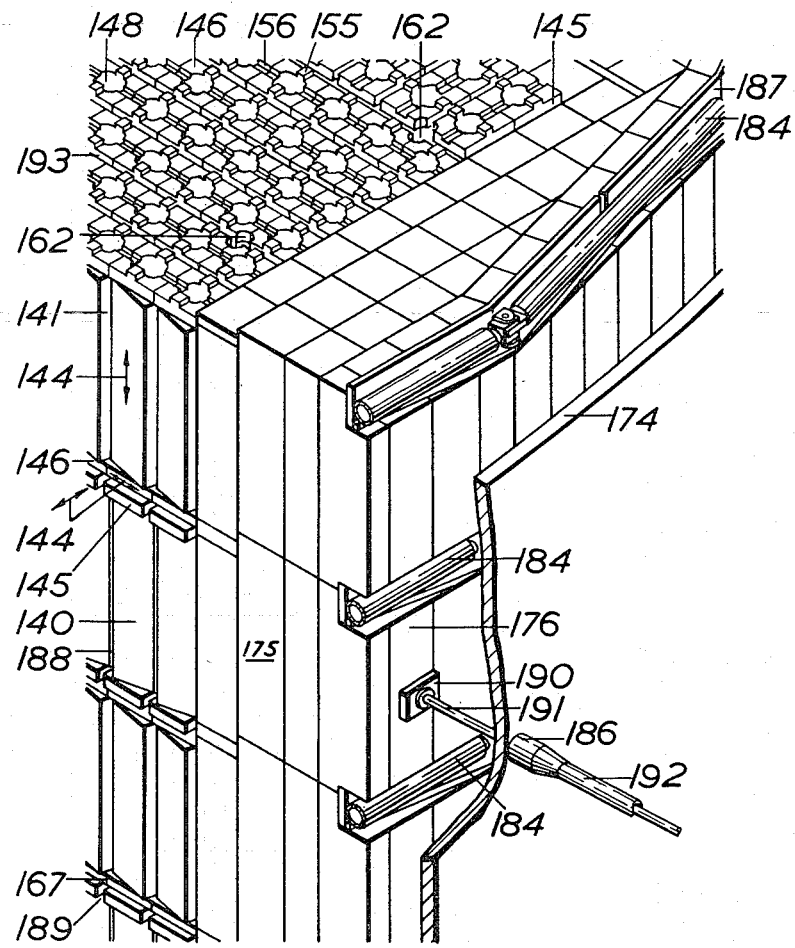
Fig. 5 is an isometric view of a part of the graphite structure.

Fig. 5 shows the pressure vessel 174 supporting a Wigner growth measuring probe 186. The probe comprises a foot 190 supported on a rod 191 movable in a tight fitting gland inside a sleeve 192 which is welded to the pressure vessel 174. The foot 190 rests against one of the walls 176 of the reflector structure 175. Tension bands 184 operating in conjunction with restraint plates 187 are shown. There are no spaces between the reflector graphite blocks and no requirement for tiles (like tiles 145, 146) as the Wigner growth of the graphite in the reflector blocks is negligible.

The main graphite structure is shown as blocks 140, 141 separated by tiles 145, 146; the butting faces 167 being indicated. Arrows 144 show the direction of minimum Wigner growth and allowance for growth in the other axes is permitted by spaces 188, 189 and 193. The keys 155, keyways 156, fuel element and coolant channels 148 and control rod holes 162 are shown.

We claim:

1. A graphite moderator structure for a nuclear reactor comprising stacks of uniform right prismatic graphite blocks positioned in layers extending in the direction of the lengths of the blocks, the blocks defining coolant channels parallel to their length, and having minimum Wigner growth properties in the direction of their length, and pairs of graphite tiles separating adjacent end faces of the blocks, the tiles being arranged so that first, they form two layers between each layer of blocks with their principal faces parallel to the end faces of the blocks, second, that all the tiles in any one layer having minimum Wigner growth properties in a direction which is one co-ordinate axis normal to the longitudinal axes of the blocks and that all the tiles in the adjacent layers have minimum Wigner growth properties in a direction which is the other coordinate axis normal to the longitudinal axis, third, the principal faces of the tiles and the end faces of the blocks are provided with means defining interlocking keys and keyways parallel to both said co-ordinate axes, fourth, the side walls of said tiles which are normal to the direction of minimum Wigner growth in their respective tiles butt together and the other side walls are spaced apart, fifth, the length of the side walls of the tiles lying along the direction of minimum Wigner growth is greater than the parallel dimensions of the vertical blocks above and below and is equal to the required lattice pitch of the coolant channels, and sixth, the tiles have means defining apertures co-axial with and of similar size to said coolant channels.

2. A graphite moderator structure for a nuclear reactor as claimed in claim 1 wherein said interlocking keys and keyways are rectangular in section and comprise keys on both principal faces of the tiles extending in a direction normal to the direction of minimum Wigner growth in their respective tiles and keyways extending in a direction parallel to the direction of minimum Wigner growth.

3. A graphite moderator structure for a nuclear reactor as claimed in claim 1 wherein the spacing between said blocks as determined by the dimension of the side walls of the tiles parallel to the direction of minimum Wigner growth in the tiles varies in zones by an amount directly related to the mean radiation intensity in the zones to which the blocks are subjected in the operation of the reactor.

4. A graphite moderator structure for a nuclear reactor as claimed in claim 1 wherein the diametral dimensions of said coolant channels and said apertures co-axial with the coolant channels vary in zones by an amount related to the mean heat generation in the zones whereby there is sensibly constant temperature rise in coolant passing through said coolant channels.

References Cited in the file of this patent

UNITED STATES PATENTS 2,708,656    Fermi et al. _ _ _ _ _ _ _ _ _ _ _ _ May 17, 1955

OTHER REFERENCES

Harwell: The British Atomic Energy Establishment (1946–1951), London, Her Majesty's Stationary Office, 1952, pp. 95–106.